United States Patent
Ohsawa et al.

(10) Patent No.: US 10,707,493 B2
(45) Date of Patent: Jul. 7, 2020

(54) ELECTRODE AND METHOD OF MANUFACTURING ELECTRODE

(71) Applicant: NISSAN MOTOR CO., LTD., Yokohama-shi, Kanagawa (JP)

(72) Inventors: Yasuhiko Ohsawa, Kanagawa (JP); Hajime Satou, Kanagawa (JP); Yuki Kusachi, Kanagawa (JP); Hiroshi Akama, Kanagawa (JP); Hideaki Horie, Kanagawa (JP); Masatoshi Okura, Kyoto (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 66 days.

(21) Appl. No.: 15/769,859

(22) PCT Filed: Sep. 21, 2016

(86) PCT No.: PCT/JP2016/077904
§ 371 (c)(1),
(2) Date: Apr. 20, 2018

(87) PCT Pub. No.: WO2017/068907
PCT Pub. Date: Apr. 27, 2017

(65) Prior Publication Data
US 2018/0316018 A1 Nov. 1, 2018

(30) Foreign Application Priority Data
Oct. 23, 2015 (JP) .................................. 2015-209303

(51) Int. Cl.
*H01M 4/66* (2006.01)
*H01M 4/62* (2006.01)
(Continued)

(52) U.S. Cl.
CPC ............ *H01M 4/668* (2013.01); *H01G 11/26* (2013.01); *H01G 11/28* (2013.01); *H01G 11/68* (2013.01);
(Continued)

(58) Field of Classification Search
CPC ............ H01M 4/66; H01M 4/62; H01M 4/04; H01M 4/139; H01M 4/70
See application file for complete search history.

(56) References Cited

U.S. PATENT DOCUMENTS

| | | | |
|---|---|---|---|
| 8,535,851 B1 * | 9/2013 | Brost | ...................... H01M 4/94 429/216 |
| 2008/0220330 A1 | 9/2008 | Hosaka et al. | |

(Continued)

FOREIGN PATENT DOCUMENTS

| | | |
|---|---|---|
| JP | 2006-190649 A | 7/2006 |
| JP | 2010-146901 A | 7/2010 |

(Continued)

OTHER PUBLICATIONS

Machine Translation of: JP 2013-030410 A, Wasamoto et al., Feb. 7, 2013.*

*Primary Examiner* — Kenneth J Douyette
(74) *Attorney, Agent, or Firm* — Foley & Lardner LLP

(57) ABSTRACT

The present invention provides an electrode capable of reducing contact resistance between a resin current collector and the electrode, and a method of manufacturing the electrode. The electrode of the present invention includes a positive electrode current collector 11 containing a polymer material and a conductive filler, a positive electrode active material layer 13 disposed adjacent to the positive electrode current collector, and a concavoconvex shape 11c corresponding to a concavoconvex shape 13c formed on a surface of the positive electrode active material layer that is in contact with the positive electrode current collector, the (Continued)

concavoconvex shape being formed on a surface of the positive electrode current collector that is in contact with the positive electrode active material layer. In the concavoconvex shape in the positive electrode current collector, at least a part of the positive electrode conductive member 14 that is in electrical contact with the conductive filler exists in the positive electrode current collector beyond the surface of the positive electrode current collector.

4 Claims, 6 Drawing Sheets

(51) Int. Cl.
| | |
|---|---|
| *H01M 4/04* | (2006.01) |
| *H01G 11/28* | (2013.01) |
| *H01G 11/68* | (2013.01) |
| *H01G 11/70* | (2013.01) |
| *H01G 11/86* | (2013.01) |
| *H01M 4/139* | (2010.01) |
| *H01M 4/70* | (2006.01) |
| *H01G 11/26* | (2013.01) |
| *H01M 4/13* | (2010.01) |
| *H01M 4/02* | (2006.01) |
| *H01M 10/0525* | (2010.01) |

(52) U.S. Cl.
CPC ............. *H01G 11/70* (2013.01); *H01G 11/86* (2013.01); *H01M 4/02* (2013.01); *H01M 4/04* (2013.01); *H01M 4/0404* (2013.01); *H01M 4/0433* (2013.01); *H01M 4/13* (2013.01); *H01M 4/139* (2013.01); *H01M 4/624* (2013.01); *H01M 4/66* (2013.01); *H01M 4/70* (2013.01); *H01M 10/0525* (2013.01); *Y02T 10/7011* (2013.01)

(56) References Cited

U.S. PATENT DOCUMENTS

| | | | |
|---|---|---|---|
| 2011/0111277 A1* | 5/2011 | Bessho | ............... H01M 4/0404 |
| | | | 429/94 |
| 2011/0206974 A1 | 8/2011 | Inoue et al. | |
| 2012/0052378 A1 | 3/2012 | Torata et al. | |
| 2012/0070736 A1* | 3/2012 | Ohara | ..................... H01M 4/13 |
| | | | 429/211 |
| 2015/0294802 A1* | 10/2015 | Kato | ..................... H01M 4/667 |
| | | | 361/502 |

FOREIGN PATENT DOCUMENTS

| | | |
|---|---|---|
| JP | 2011-065842 A | 3/2011 |
| JP | 2013-030410 A | 2/2013 |

* cited by examiner

ELECTRODE AND METHOD OF MANUFACTURING ELECTRODE

TECHNICAL FIELD

The present invention relates to an electrode and a method of manufacturing the electrode.

BACKGROUND ART

In recent years, development of electric vehicles and hybrid electric vehicles using batteries has been earnestly carried out from the consideration of an environment. However, since electric vehicles are still relatively expensive compared to gasoline cars, cost reduction is required, and improvement of energy density is required for secondary batteries as a power source.

In the prior art, as a technology for improving the power density per unit weight of a battery, a technique using a current collector including a polymer material and a conductive filler has been proposed (see Patent Literature 1).

CITATION LIST

Patent Literature

Patent Literature 1: JP 2006-190649 A

SUMMARY OF INVENTION

Technical Problem

However, when a resin current collector is used as in Patent Literature 1, there is a problem that contact resistance between the resin current collector and an electrode is increased.

In order to solve the above problem, an object of the present invention is to provide an electrode capable of reducing contact resistance between a resin current collector and an electrode and a method of manufacturing the electrode.

Solution to Problem

An electrode according to the present invention achieving the above object includes a resin current collector containing a polymer material and a conductive filler, an active material layer disposed adjacent to the resin current collector, and a second concavoconvex shape that coincides with a first concavoconvex shape formed on a surface of the active material layer that is in contact with the resin current collector, the second concavoconvex shape being formed on a surface of the resin current collector that is in contact with the active material layer, wherein in the second concavoconvex shape in the resin current collector, at least a part of a conductive member that is in electrical contact with the conductive filler exists in the resin current collector beyond the surface of the resin current collector.

A method of manufacturing an electrode, according to the present invention achieving the above object, includes applying ink containing a conductive material to the resin current collector to for a coating film on the resin current collector, pressing a mold having a surface shape of the convex shape or the concavoconvex shape against the coating film of the resin current collector to perform hot pressing and thus to form the surface shape of the mold on the resin current collector, and forming the active material layer at a site of the resin current collector where the surface shape is provided.

DESCRIPTION OF EMBODIMENTS

Figure 1:
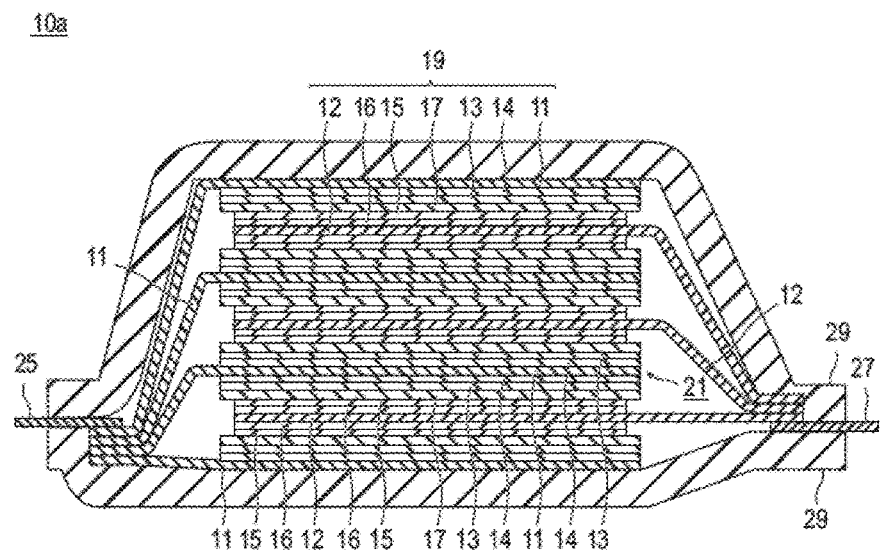
FIG. 1 is a schematic cross-sectional view showing a basic configuration of a flat non-bipolar nonaqueous electrolyte lithium ion secondary battery which is one embodiment of a lithium ion secondary battery.

Hereinafter, embodiments of the present invention will be described with reference to the accompanying drawings. In the description of the drawings, the same elements are denoted by the same reference numerals, and duplicate descriptions will be omitted. The sizes and ratios of the members in the drawing are exaggerated for convenience of explanation, and can be different from the actual sizes and ratios.

A lithium ion secondary battery, which is a target of this embodiment, only needs to include an electrode to be described below, and the other constituent requirements should not be particularly limited.

For example, when the lithium ion secondary batteries are classified in terms of the form and structure, the lithium ion secondary battery may be applicable to any batteries having known forms and structures such as a laminate type (flat type) battery and a winding type (barrel type) battery. The structure of the laminate type (flat type) battery contributes to ensuring long-term reliability by a simple sealing technology such as thermo-compression bonding, and therefore it has the advantage in terms of cost and workability.

Furthermore, in terms of electrical connection (electrode structure) inside the lithium ion secondary battery, the electrical connection structure may be applicable not only to a non-bipolar (internal parallel connection type) batteries but also to a bipolar (internal serial connection type) batteries.

When the lithium ion secondary batteries are classified by the type of electrolyte layers used therein, the electrical connection structure may be applicable to any batteries including conventionally-known types of known electrolyte layers such as a solution electrolyte type battery in which a solution electrolyte such as a non-aqueous electrolyte solution is used for an electrolyte layer and a polymer battery in which a polymer electrolyte is used for an electrolyte layer. The polymer batteries are classified into a gel electrolyte type batteries using a polymer gel electrolyte (also simply referred to as a gel electrolyte) and a solid polymer (all solid state) type batteries using a polymer solid electrolyte (also simply referred to as a polymer electrolyte).

FIG. 1 is a schematic cross-sectional view schematically showing a basic configuration of a flat type (laminate type) non-bipolar nonaqueous electrolyte lithium ion secondary battery (hereinafter also simply referred to as a "laminate type battery"). As shown in FIG. 1, a laminate type battery 10a according to this embodiment has a structure in which a power generating element 21 with a substantially rectangular shape, in which a charge and discharge reaction actually occurs, is sealed inside of a battery outer casing material 29 as an outer casing body. Herein, the power generating element 21 has a configuration in which a positive electrode, an electrolyte layer 17, and a negative electrode are stacked. The positive electrode has a structure in which a positive electrode conductive member 14 and a positive electrode active material layer 13 are arranged in this order on both surfaces of a positive electrode current collector 11. The negative electrode has a structure in which a negative electrode conductive member 16 and a negative electrode active material layer 15 are arranged in this order on both surfaces of a negative electrode current collector 12. Specifically, one positive electrode conductive member 14 and positive electrode active material layer 13, and the negative electrode active material layer 15 and negative electrode conductive member 16 adjacent thereto are disposed to face each other via the electrolyte layer 17, and the negative electrode, the electrolyte layer, and the positive are laminated in this order. Accordingly, the neighboring positive electrode, electrolyte layer, and negative electrode form one single battery layer 19. Therefore, it can also be said that, when a plurality of the single battery layers 19 are laminated, the laminate type battery 10a shown in FIG. 1 has a configuration in which electrically parallel connection is made among them.

Meanwhile, on the outermost layer positive electrode current collector which is present on both outermost layers of the power generating element 21, the positive electrode active material layer 13 is disposed only on a single surface; however, active material layers may be formed on both surfaces. Namely, not only a current collector exclusive for an outermost layer in which an active material layer is formed only on a single surface can be prepared but also a current collector having active material layers on both surfaces can be directly used as a current collector of an outermost layer. Furthermore, by reversing the arrangement of the positive electrode and negative electrode of FIG. 1, it is also possible that the outermost layer negative electrode current collector is disposed on both outermost layers of the power generating element 21 and a negative electrode active material layer is disposed on a single surface or both surfaces of the outermost layer negative electrode current collector.

The positive electrode current collector 11 and the negative electrode current collector 12 have a structure in which a positive electrode current collecting plate 25 and a negative electrode current collecting plate 27, which conductively communicate with each electrode (positive electrode and negative electrode), are attached respectively and inserted to a terminal of the battery outer casing material 29 so as to be led to the outside of the battery outer casing material 29. The positive electrode current collecting plate 25 and negative electrode current collecting plate 27 may be attached, respectively, via a positive electrode lead and a negative electrode lead (not shown), to the positive electrode current collector 11 and the negative electrode current collector 12 of each electrode by ultrasonic welding or resistance welding as necessary.

In FIG. 1, the conductive members are arranged on both surfaces of the current collector; however, the present invention is not limited to the above-described embodiment, and the conductive member may be disposed to at least one surface of the current collector. Preferably, the conductive members are arranged (formed) on both surfaces of the current collector. That is, it is preferable that (i) the positive electrode conductive member 14 and the positive electrode active material layer 13 be formed on both surfaces of the current collector 11 in this order and/or (ii) the negative electrode conductive member 16 and the negative electrode active material layer 15 be formed on both surfaces of the current collector 11 in this order. In FIG. 1, the conductive member is provided to all of the current collectors; however, the present invention is not limited to the above-described embodiment. That is, when the laminate type battery includes a plurality of single battery layers (current collectors), the conductive member may be disposed to at least one of the current collectors; however, preferably, the conductive member is disposed to all of the current collectors.

Figure 2:
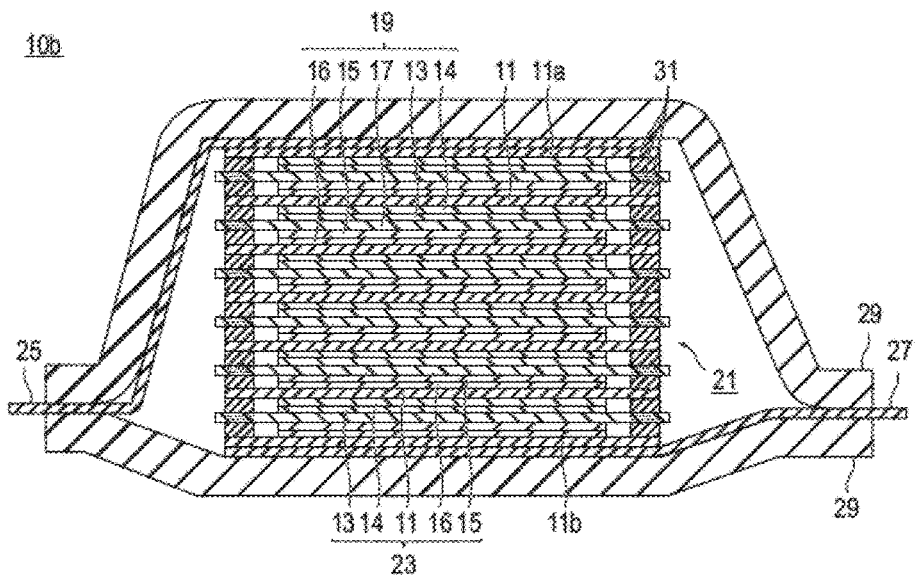
FIG. 2 is a schematic cross-sectional view showing a basic configuration of a bipolar lithium ion secondary battery which another embodiment of the lithium ion secondary battery.

FIG. 2 is a schematic cross-sectional view schematically showing a basic configuration of a bipolar nonaqueous electrolyte lithium ion secondary battery (hereinafter also simply referred to as a "bipolar battery") 10b. The bipolar battery 10b shown in FIG. 2 has a structure in which the power generating element 21 with a substantially rectangular shape, in which a charge and discharge reaction actually occurs, is sealed inside of a laminate film serving as the battery outer casing material 29.

As shown in FIG. 2, the power generating element 21 of the bipolar battery 10b includes a plurality of bipolar electrodes 23. In each of the bipolar electrodes 23, a positive electrode conductive member 14 and a positive electrode active material layer 13, which are electrically coupled to one surface of the current collector 11, are formed in this order, and on the opposite surface of the current collector 11, the negative electrode conductive member 16 and the negative electrode active material layer 15, which are electrically coupled to each other, are formed in this order. Each of the bipolar electrodes 23 is laminated with the electrolyte layer 17 interposed therebetween to form the power generating element 21. The electrolyte layer 17 has a configuration in which an electrolyte is held at a center portion in a plane direction of a separator serving as a base material. At this time, each of the bipolar electrodes 23 and each of the electrolyte layers 17 are alternately laminated such that the positive electrode conductive member 14 and the positive electrode active material layer 13 of one bipolar electrode 23 face the negative electrode conductive member 16 and the negative electrode active material layer 15 of another bipolar electrode 23 adjacent to the one bipolar electrode 23 with the electrolyte layer 17 interposed therebetween. That is, the electrolyte layer 17 is disposed to be interposed between the positive electrode active material layer 13 and the positive electrode conductive member 14 of one bipolar electrode 23 and the negative electrode active material layer 15 and the negative electrode conductive member 16 of another bipolar electrode 23 adjacent to the one bipolar electrode 23.

The positive electrode active material layer 13, the positive electrode conductive member 14, the electrolyte layer 17, the negative electrode active material layer 15, and the negative electrode conductive member 16 adjacent to each other constitute one single battery layer 19. Accordingly, it can also be said that the bipolar battery 10b has a configuration in which the single battery layers 19 are laminated. For the purpose of preventing liquid junction caused by leakage of the electrolyte solution from the electrolyte layer 17, a sealing portion (insulating layer) 31 is disposed at an outer periphery of the single battery layer 19. Only one surface of an outermost layer current collector 11a on the positive electrode side located at the outermost layer of the power generating element 21 is formed with the positive electrode active material layer 13. Further, only one surface of an outermost layer current collector 11b on the negative electrode side located at the outermost layer of the power generating element 21 is formed with the negative electrode active material layer 15. However, the positive electrode active material layers 13 may be formed on both surfaces of the outermost layer current collector 11a on the positive electrode side. Likewise, the negative electrode active material layers 15 may be formed on both surfaces of the outermost layer current collector lib on the negative electrode side.

Further, in the bipolar battery 10b shown in FIG. 2, the positive electrode current collecting plate 25 is disposed to be adjacent to the outermost layer current collector 11a on the positive electrode side and extends to be exposed on the outside of the laminate film serving as the battery outer casing material 29. On the other hand, the negative electrode current collecting plate 27 is disposed to be adjacent to the outermost layer current collector lib on the negative electrode side and similarly extends to be exposed on the outside of the laminate film serving as the battery outer casing material 29.

In the bipolar battery 10b shown in FIG. 2, generally, a sealing portion 31 is provided around each of the single battery layers 19. The sealing portion 31 is provided in order to seal an electrolyte solution of each single battery layer and to prevent contact between the current collectors 11 adjacent to each other inside the battery or occurrence of a short circuit caused by slight unevenness at an end portion of the single battery layer 19 in the power generating element 21. By providing such sealing portions 31, it is possible to ensure long-term reliability and safety and to provide the bipolar battery 10b with high quality.

The number of the single battery layers 19 laminated is adjusted depending on a desired voltage. The number of the single battery layers 19 laminated in the bipolar battery 10b may be lowered as long as sufficient output can be ensured. Also for the bipolar battery 10b, there is a need to prevent external damage at the time of operation and avoid environmental worsening. Thus, the bipolar battery 10b preferably has a structure in which the power generating element 21 is sealed in the laminate film, serving as the battery outer casing material 29, under reduced pressure, and the positive electrode current collecting plate 25 and the negative electrode current collecting plate 27 are exposed on the outside of the laminate film serving as the battery outer casing material 29.

In FIG. 2, the conductive members are arranged on both surfaces of the current collector; however, the present invention is not limited to the above-described embodiment, and the conductive member may be disposed to at least one of the current collectors. Preferably, the conductive members are arranged (formed) on both surfaces of the current collector. That is, it is preferable that the positive electrode conductive member 14 and the positive electrode active material layer 13 be formed on one surface of the current collector 11 in this order and the negative electrode conductive member 16 and the negative electrode active material layer 15 be formed on the other surface thereof in this order. In FIG. 2, the conductive member is provided to all of the current collectors; however, the present invention is not limited to the above-described embodiment. That is, when the laminate type battery includes a plurality of single battery layers (current collectors), the conductive member may be disposed to at least one of the current collectors; however, preferably, the conductive member is disposed to all of the current collectors.

Figure 3:
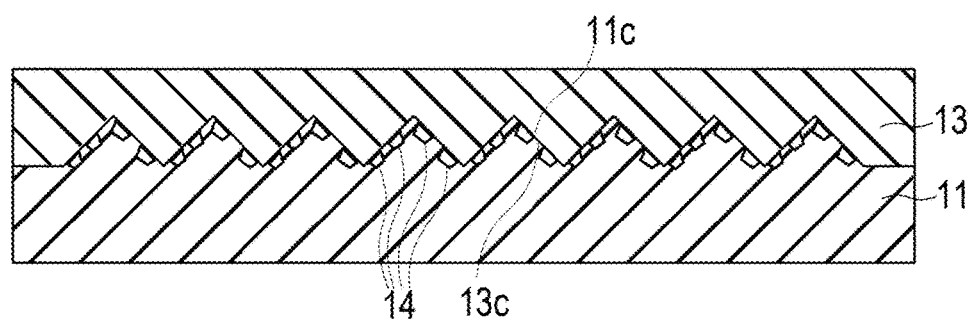
FIG. 3 is a schematic cross-sectional view showing an embodiment of an electrode.

FIG. 3 is a schematic cross-sectional view showing an embodiment of an electrode. A positive electrode shown in FIG. 3 includes the positive electrode current collector 11 having a conductive resin layer, as described below, the positive electrode conductive member 14 formed by being embedded on the surface of the positive electrode current collector 11, and the positive electrode active material layer 13 formed on a surface of the positive electrode conductive member 14. In the present specification, unless otherwise stated, the positive and negative electrode current collectors are collectively referred to as the "current collector", the positive and negative electrode conductive members are collectively referred to as the "conductive member", and the positive and negative electrode active material layers are collectively referred to as the "active material layer". For this reason, for example, the "current collector" means any of the positive electrode current collector, the negative electrode current collector, and the positive and negative electrode current collectors. The constituent elements of the electrode will be described below.

(Current Collector Including Conductive Resin Layer)

The electrode includes a current collector having a conductive resin layer containing a polymer material and a conductive filler. The polymer material may be a conductive polymer or a polymer having no conductivity. In addition, the polymer material can be used alone or can be used as a mixture of two or more kinds thereof. Further, the polymer material may be a commercially available product or a synthesis product.

The conductive polymer is selected from materials that have conductivity but do not have conductivity with respect to ions used as a charge transfer medium. It is considered that these conductive polymers show conductivity by the formation of an energy band with a conjugated polyene system thereof. As a typical example, a polyene-based conductive polymer that has been proceeding toward practical use in an electrolytic capacitor or the like can be used. Specific examples thereof include polyaniline, polypyrrole, polythiophene, polyacetylene, polyparaphenylene, polyphenylene vinylene, polyacrylonitrile, polyoxadiazole, and mixtures thereof. From, the viewpoint of electron conductivity and stable use in a battery, polyaniline, polypyrrole, polythiophene, and polyacetylene are more preferable.

Examples of the polymer material having no conductivity include polyethylene (PE) (high-density polyethylene (HDPE), low-density polyethylene (LDPE), or the like), polypropylene (PP), polystyrene (PS), polyethylene terephthalate (PET), polyether nitrile (PEN), polyimide (PI), polyamide (PA), polyamide imide (PAI), polytetrafluoroethylene (PTFE), styrene-butadiene rubber (SBR), polyacrylonitrile (PAN), polymethyl acrylate (PMA), polymethylmethacrylate (PMMA), polyvinyl chloride (PVC), polyvinylidene fluoride (PVdF), polyvinylidene chloride (PVDC), and mixtures thereof. These materials have a very wide potential window to be stable to either of positive and negative electrode potentials and save weight for improvement in battery output density. Among them, from the viewpoint of durability with respect to the electrolyte solution to be used, various polyolefins, such as polypropylene and polyethylene, or a copolymer and mixture thereof are preferable.

The conductive filler to be used is selected from materials having conductivity. Preferably, from the viewpoint of suppressing ion transmission in the conductive resin layer, a material having no conductivity with respect to ions is preferably used.

Specifically, a carbon material, aluminum, gold, silver, copper, iron, platinum, chromium, tin, indium, antimony, titanium, nickel, and the like are exemplified, but the materials are not limited thereto. These conductive fillers may be used alone or in combination of two or more kinds, thereof. Further, alloy materials thereof such as stainless steel (SUS) may be used. From the viewpoint of corrosion resistance, aluminum, stainless steel, a carbon material, or nickel is preferable, and a carbon material or nickel is more preferable. Furthermore, these conductive fillers may be in the form of a particulate ceramic material or resin material coated therearound with a metal described above by plating or the like.

Examples of the carbon material include at least one selected from the group consisting of acetylene black, carbon black, Vulcan, Black Pearls, carbon nanofiber, Ketjen black, carbon nanotube, carbon nanohorn, carbon nanoballoon, hard carbon, and fullerene. These carbon materials have a very large potential window to be stable to a wide range of positive and negative electrode potentials and are excellent in conductivity. Further, since the carbon materials are very lightweight, mass increase is minimized. Furthermore, the carbon materials are often used as a conductive aid for an electrode, and thus even when the carbon materials come into contact with the conductive aids, the carbon materials exhibit very low contact resistance due to the use of the same carbon material. When the carbon material is used as a conductive filler, it is feasible to subject the surface of the carbon material to hydrophobic treatment so as to decrease the compatibility of the electrolyte to the current collector and thereby make it unlikely that the electrolyte will penetrate into pores of the current collector.

When the charge-discharge potential of the negative electrode active material is close to the deposition potential of Li, insertion of Li occurs in the conductive filler such as carbon material by charging and discharging, and thus the conductive filler is expanded. For this reason, there is a risk that the current collector may be damaged (damages are caused to the current collector). Thus, for the conductive filler of the current collector facing, the negative electrode, a material which does not cause lithiation, such as Ni, Cu, Fe, or SUS, is preferable. In addition, a conductive filler whose surface is coated with these materials can be also preferably used. Here, the term "lithiation" means that insertion and desorption of Li+ accompanying reduction and occurrence of alloying with Li.

The shape of the conductive filler is not particularly limited, and a conventionally-known shape such as a granular shape, a powder shape, a fiber-like shape, a plate-like shape, a lump shape, a cloth shape, or a mesh-like shape can be selected suitably. For example, when conductivity is intended to be provided in a wide range, a conductive filler having a granular shape is preferably used. On the other hand, when conductivity is intended to be further improved in a specific direction, a conductive filler having a shape with a certain directionality such as a fiber-like shape is preferably used.

Although the average particle size (average particle size of primary particles) of the conductive filler is not particularly limited, it is preferably approximately 0.01 to 10 μm, and more preferably 0.01 to 1 μm. In the present specification, the "particle size" means the greatest length L between any two points on the circumference of the conductive filler. For a value of the "average particle size", a value is employed which is calculated with an observation means, such as a scanning electron microscope (SEM) or a transmission electron microscope (TEM), as an average value of particle size of the particles observed in several to several tens of fields of view.

When the conductive filler has a fiber-like shape, the average fiber length thereof is not particularly limited, but is preferably 0.1 to 100 μm. In the present specification, for the average fiber length, a value is employed which is calculated with an observation means, such as a scanning electron microscope (SEM) or a transmission electron microscope (TEM), as an average value of fiber lengths of the fibers observed in several to several tens of fields of view. Further, when the conductive filler has a fiber-like shape, the average diameter thereof is also not particularly limited, but is preferably 0.01 to 1 μm.

The content of the polymer material in the conductive resin layer is not particularly limited, but is preferably 10 to 95 parts by mass and more preferably 12 to 90 parts by mass when the total amount of the polymer material and the conductive filler in the conductive resin layer is considered as 100 parts by mass.

Further, the content of the conductive filler in the conductive resin layer is also not particularly limited. However, the content of the conductive filler is preferably 5 to 90 parts by mass and more preferably 10 to 88 parts by mass when the total amount of the polymer material and the conductive filler in the conductive resin layer is considered as 100 parts by mass. When such an amount of the conductive filler is added to the polymer material, sufficient conductivity can be provided to the current collector while an increase in mass of the current collector is suppressed.

In the conductive resin layer, other additives may be contained in addition to the polymer material and the conductive filler. Examples of the other additives include carboxylic acid-modified polypropylene such as maleic anhydride modified polypropylene. The added amount of the other additives is not particularly limited, but is preferably 1 to 25 parts by mass with respect to total 100 parts by mass of the polymer material and the conductive filler.

The thickness of the current collector including a conductive resin layer is preferably 1 to 200 μm, more preferably 3 to 150 μm, and further preferably 5 to 100 μm.

The method for producing a current collector including a conductive resin layer is not particularly limited, and for example, a method is exemplified in which after each component of a polymer material, a conductive filler, and as necessary, an additive is melted and kneaded by an extruder or the like, the melted-and-kneaded material is subjected to rolling by a hot pressing device.

The current collector (the conductive resin layer) may have a single layer structure or a laminate structure obtained by suitably combining layers formed from these materials. Alternatively, the current collector may have another layer in addition to the conductive resin layer. As another layer, for example, there are a resin layer formed from a resin having conductivity or a metal layer. The former is preferable from the viewpoint of lightness of the current collector. In addition, the latter is preferable from the viewpoint of blocking the movement of lithium ions between the single battery layers.

(Conductive Member)

The electrode includes a conductive member which is in electrical contact with the conductive filler contained in the conductive resin layer of the current collector. The conductive member is disposed between the current collector and the active material layer. With the configuration, the conductive member can be in electrical contact with the current collector efficiently and stably, and thus it is possible to reduce the contact resistance and improve the durability.

The material of the conductive member is not particularly limited, but it is preferable to contain at least one conductive material selected from the group consisting of at least one metal selected from the group consisting of a metal which has an ionization tendency lower than that of iron, iron, titanium, zirconium, tantalum, and niobium, an alloy having the metal as a main component, and a conductive carbon. The reason for this is that these materials are less likely to form an oxide film having insulating properties on the surface thereof and the electrical contact with the conductive filler is maintained over a long time.

More specifically, specific examples of the metal which has an ionization tendency lower than that of iron include cobalt, nickel, tin, antimony, copper, silver, palladium, iridium, platinum, and gold. Since the metal which has an ionization tendency lower than that of iron has small resistance even when the oxide film is formed, the contact resistance between the current collector and the current collecting plate can be reduced. Examples of the alloy include stainless steel (SUS).

Specific examples of the conductive carbon include at least one selected from the group consisting of acetylene black, carbon black, Vulcan, Black Pearls, carbon nanofiber, ketjen black, carbon nanotube, carbon nanohorn, carbon nanoballoon, hard carbon, and fullerene.

Herein, it is preferable that the material of the conductive member be suitably selected depending on the positive electrode and the negative electrode. For example, when the conductive member is a positive electrode conductive member, the material of the conductive member is preferably at least one selected from the group consisting of conductive carbon, titanium, and stainless steel. That is, it preferable that the active material layer be a positive electrode active material layer, and the conductive member contain at least one conductive material selected from the group consisting of conductive carbon, titanium, and stainless steel. Since these materials are excellent in corrosion resistance (oxidation resistance), the durability of the electrode can be further improved. In addition, for example, when the conductive member is a negative electrode conductive member, the material of the conductive member is preferably at least one selected from the group consisting of nickel, copper, iron, and stainless steel. That is, it is preferable that the active material layer be a negative electrode active material layer and the conductive member contain at least one conductive material selected from the group consisting of nickel, copper, iron, and stainless steel. These materials can prevent deterioration caused by insertion and desorption of Li+ or alloying with Li.

The conductive material may be used alone or may be used as a mixture of two or more kinds thereof.

The shape of the conductive member is not particularly limited, and a conventionally-known shape such as a granular shape, a powder shape, a fiber-like shape, a plate-like shape, a lump shape, a cloth shape, or a mesh-like shape can be selected suitably.

Although the average particle size (average particle size of primary particles) of the material of the conductive member is not particularly limited, it is preferably approximately 0.01 to 10 μm, and more preferably 0.01 to 1 μm. With such a size, the conductive filler can be effectively in contact with the unevenness on the surface of the current collector. Thus, the electrical contact between the current collector and the conductive member can be further increased. In the present specification, the "particle size" means the greatest length L between any two points on the circumference of the conductive filler. For a value of the "average particle size", a value is employed which is calculated with an observation means, such as a scanning electron microscope (SEM) or a transmission electron microscope (TEM), as an average value of particle size of the particles observed in several to several tens of fields of view. In an example, although the size of the material of the conductive member is described as the standard particle size range of the primary particles, the standard particle size range is preferably included in the above average particle size range.

When the material of the conductive member has a fiber-like shape, the average fiber length thereof is not particularly limited, but is preferably 0.1 to 100 μm. In the present specification, for the average fiber length, a value is employed which is calculated with an observation means, such as a scanning electron microscope (SEM) or a transmission electron microscope (TEM), as an average value of fiber lengths of the particles observed in several to several tens of fields of view. Further, when the conductive filler has a fiber-like shape, the average diameter thereof is also not particularly limited, but is preferably 0.01 to 1 μm. With such a size, the conductive filler can be effectively in contact with the unevenness on the surface of the current collector. Thus, the electrical contact between the current collector and the conductive member can be further increased. Furthermore, when the conductive filler has a fiber-like shape, the two-dimensional (horizontal) electrical contact can be increased only by adding a small amount of the conductive filler, which is preferable.

The conductive member may be formed only from the above-described conductive material or may contain other materials as described below. In any cases, the content of the conductive material in the conductive member is preferably larger than the content of the conductive filler in the conductive resin layer. That is, the conductive member preferably contains a larger amount of the conductive material than the content of the conductive filler in the conductive resin layer. With such a configuration, the durability, particularly, the charge-discharge cycle durability of the electrode can be further improved.

Further, the conductive member may contain a polymer material in addition to the above-described conductive material. Examples of the polymer material usable in the conductive member include a conductive polymer, such as polyaniline, polypyrrole, polythiophene, polyacetylene, polyparaphenylene, polyphenylene vinylene, polyacrylonitrile, or polyoxadiazole, and a polymer having no conductivity such as polyethylene (high-density polyethylene (HDPE), low-density polyethylene (LDPE), or the like), polypropylene, polystyrene, polyethylene terephthalate, polyether nitrile, polyimide, polyamide, polyamide imide, polytetrafluoroethylene, styrene-butadiene rubber, polyacrylonitrile, polymethyl acrylate, polymethylmethacrylate, polyvinyl chloride, polyvinylidene fluoride, or polyvinylidene chloride. These may be used alone or may be used as a mixture of two or more kinds thereof.

When the conductive member contains a conductive material and a polymer material, the content of the conductive material is preferably 20 to 95% by mass and more preferably 50 to 90% by mass with respect to the total mass of the conductive member. The content of the conductive material in the conductive member is preferably larger than the content of the conductive filler in the conductive resin layer. With such a configuration, the durability, particularly, the charge-discharge cycle durability of the electrode can be further improved.

Although the conductive member is provided on the current collector, regarding the shape in the plane direction thereof, the conductive member may be provided on the entire surface of the current collector or may be provided only in a region necessary for performing electrical contact with the conductive filler contained in the conductive resin layer. In addition, the conductive member may be continuously provided in the plane direction or may be partially or intermittently provided. Examples of the shape thereof include various shapes such as a mesh shape, a stripe shape, a lattice shape, a dot shape, and a band shape.

The thickness of the conductive member is preferably 0.01 to 60 μm and more preferably 0.1 to 30 μm.

It is preferable that the electrode is obtained by applying an ink containing a conductive material to a current collector to form a coating film on the current collector, then performing hot pressing to form a conductive member on the current collector, and further forming an active material layer on the conductive member. With such a structure, the conductive filler in the conductive resin layer and the conductive member is more easily in contact with each other, thus the contact resistance is further reduced, and the durability, particularly, the charge-discharge cycle durability of the electrode can be further improved.

At least a portion of the conductive member has a structure embedded on the surface of the conductive resin layer of the current collector as described above. In other words, at least a portion of the conductive member is in a state of existing in the resin current collector beyond the surface of the current collector (see the positive electrode conductive member 14 of FIG. 3). With such a structure, the conductive filler in the conductive resin layer and the conductive member is more easily in contact with each other, thus the contact resistance is further reduced, and the durability, particularly, the charge-discharge cycle durability of the electrode can be further improved.

(Interface Between Current Collector and Active Material Layer)

Figure 4A:
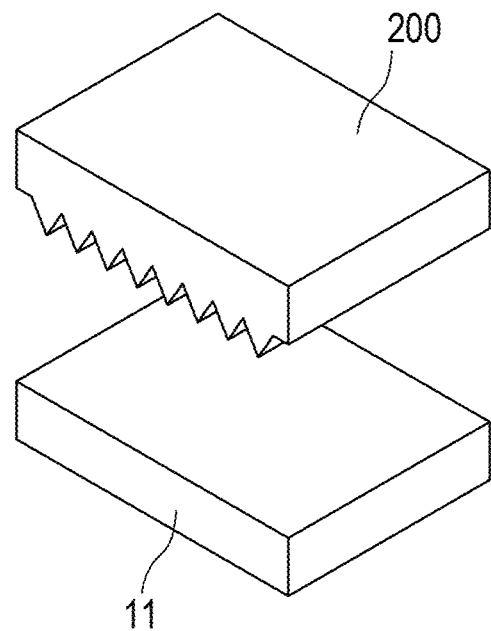
FIG. 4A is a perspective view showing a state before forming a current collector according to one embodiment of the present invention.
Figure 4B:
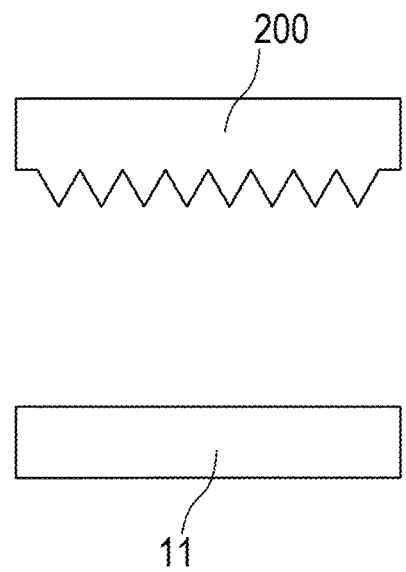
FIG. 4B is a front view showing a state before forming the current collector according to one embodiment of the present invention.
Figure 4C:
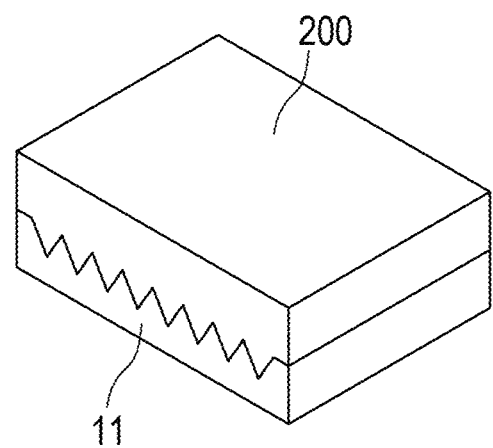
FIG. 4C is a perspective view showing a state after formation of the current collector according to one embodiment of the present invention.
Figure 4D:
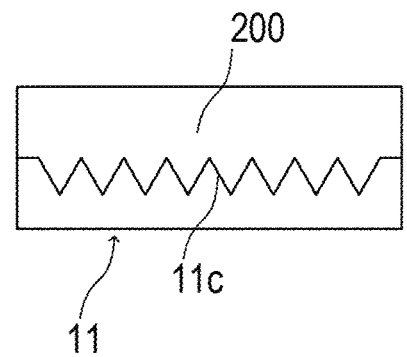
FIG. 4D is a front view showing a state after formation of the current collector according to one embodiment of the present invention.

Here, the properties of an interface between the current collector and the active material layer will be described. FIGS. 4A and 4B are a perspective view and a front view showing a state before forming a current collector according to one embodiment of the present invention, and FIGS. 4C and 4D are a perspective view and a front view showing a state after forming the current collector according to the same embodiment. Hereinafter, although the positive electrode will be described as an example, the same applies to the negative electrode.

As shown in FIG. 3, the positive electrode current collector 11 is configured to have, on a surface in contact with the positive electrode active material layer 13, a plurality of concavoconvex shapes 11c (corresponding to a second concavoconvex shape and hereinafter referred to as the concavoconvex shape 11c) formed in conformity with a concavoconvex shape 13c (corresponding to a first concavoconvex shape) formed on the positive electrode active material layer 13. As shown in FIGS. 4A to 4D, the plurality of concavoconvex shapes 11c described here means a shape artificially formed in an electrode manufacturing process. As shown in FIGS. 4A to 4D, a plurality of artificially formed convex shapes or a plurality of concavoconvex shapes means a shape formed at the interface by, for example, pressing a mold 200 having a concavoconvex shape against each interface in the current collector or the active material layer. In FIGS. 3 and 4A-4D, although a distal end of the concavoconvex shape has a triangular cross section, the present invention is not limited thereto, and if the concavoconvex shape 11c and the concavoconvex shape 13c are matched to each other, the cross section may be a polygon, such as a quadrilateral, or another shape.

Concavoconvexes can be naturally formed on the surface of the interface between the current collector and the active material layer without pressing the mold 200 or the like. As the concavoconvex shape intended in this specification, the concavoconvex shape is artificially formed between the current collector and the active material to make contact between the current collector and the active material layer favorable and reduce the contact resistance. Thus, in the formation of the interface with the current collector in the active material layer and the interface with the active material layer in the current collector, it is desirable to use a mold having a shape obtained by reversing the shape of the mold 200 that forms concavoconvexes on the contact surface with the positive electrode active material layer 13 in the positive electrode current collector 11 shown in FIGS. 4A to 4D. The artificially formed concavoconvex shape is specifically intended for the case where an average height (Rc) of roughness curve elements is not less than 2 μm. The concavoconvex shapes 11c and 13c referred to here can be observed by using a scanning electron microscope (SEM) or the like.

Returning to the description of the conductive member. In the electrode, the conductive member and the current collector may be applied to each other by a conductive adhesive member. When the conductive member and the current collector are applied to each other by the conductive adhesive member, the in-plane variation of the contact resistance is reduced. Moreover, when the conductive member has a laminate structure of two or more layers, at least two layers of the conductive member are preferably applied to each other by a conductive adhesive member. With such a structure, the in-plane variation of the contact resistance can be reduced. These conductive adhesive members to be used for the electrode will be described in the following section of the method of manufacturing an electrode.

Further, hereinafter, a preferred embodiment of the configuration other than the electrode when the electrode of the present invention is used in a lithium ion secondary battery will be described; however, the present invention has a feature in terms of the electrode, and the configuration other than the electrode is the same as in a known configuration, or a configuration with appropriate modification can be employed.

(Active Material Layer)

The active material layer contains an active material. Herein, the active material absorbs and releases ions during charge and discharge and generates electric energy. In the active material, there are a positive electrode active material having a constitution to absorb ions during discharge and release the ions during charge and a negative electrode active material having a constitution to release ions during discharge and absorb the ions during charge. The active material layer of this embodiment functions as a positive electrode active material layer when the positive electrode active material is used as the active material; on the other hand, the active material layer of this embodiment functions as a negative electrode active material layer when the negative electrode active material is used. In the present specification, matters common to the positive electrode active material and the negative electrode active material will be described simply as the "active material".

Examples of the positive electrode active material include $LiMn_2O_4$, $LiCoO_2$, $Li(Ni—Mn—Co)O_2$, and lithium-transition metal composite oxide, such as a compound in which a part of these transition metals is substituted with another element, a lithium-transition metal phosphate compound, and a lithium-transition metal sulfate compound. In some cases, two or more kinds of the positive electrode active materials may be concurrently used. From the viewpoint of capacity and output characteristics, lithium-transition metal composite oxide is preferably used as the positive electrode active material. A composite oxide containing lithium and nickel is more preferably used, and $Li(Ni—Mn—Co)O_2$ and a composite oxide in which a part of these transition metals is substituted with another element (hereinafter, simply referred to as "NMC composite oxide") is further preferably used. The NMC composite oxide has a layered crystal structure in which a lithium atom layer and a transition metal (Mn, Ni, and Co are arranged with regularity) atom layer are alternately stacked via an oxygen atom layer, and one Li atom is included per atom of transition metal M. Thus, extractable Li amount is twice the amount of spinel lithium manganese oxide, that is, as the supply power is two times higher, it can have high capacity.

As described above, the NMC composite oxide also includes a composite oxide in which a part of transition metal element is substituted with another metal element. In this case, examples of another metal element include Ti, Zr, Nb, W, P, Al, Mg, V, Ca, Sr, Cr, Fe, B, Ga, In, Si, Mo, Y, Sn, V, Cu, Ag, and Zn. Ti, Zr, Nb, W, P, Al, Mg, V, Ca, Sr, and Cr are preferable, Ti, Zr, P, Al, Mg, and Cr are more preferable, and from the viewpoint of improving the cycle characteristics, Ti, Zr, Al, Mg, and Cr are further preferable.

By having a high theoretical discharge capacity, the NMC composite oxide preferably has a composition represented by the general formula (1): $Li_aNi_bMn_cCo_dM_xO_2$ (with the proviso that, in the formula, a, b, c, d, and x satisfy $0.9 \leq a \leq 1.2$, $0 < b < 1$, $0 < c \leq 0.5$, $0 < d \leq 0.5$, $0 \leq x \leq 0.3$, and $b+c+d=1$. M represents at least one element selected from Ti, Zr, Nb, W, P, Al, Mg, V, Ca, Sr, and Cr). Herein, a represents the atomic ratio of Li, b represents the atomic ratio of Ni, c represents the atomic ratio of Co, d represents the atomic ratio of Mn, and x represents the atomic ratio of M. From the viewpoint of the cycle characteristics, it is preferable that $0.4 \leq b \leq 0.6$ in the general formula (1) be satisfied. The composition of each element can be measured by induction coupled plasma (ICP) spectroscopy, for example.

In general, from the viewpoint of improving purity and improving electron conductivity of a material, nickel (Ni), cobalt (Co), and manganese (Mn) are known to contribute to capacity and output characteristics. Ti or the like replaces a part of transition metal in a crystal lattice. From the viewpoint of the cycle characteristics, a part of transition element is preferably substituted with another metal element, and particularly, it is preferable that $0 < x \leq 0.3$ in the general formula (1) be satisfied. The crystal structure is stabilized by solid-dissolving at least one selected from the group consisting of Ti, Zr, Nb, W, P, Al, Mg, V, Ca, Sr, and Cr, and as a result, a decrease in capacity of the battery can be prevented even when charging and discharging are repeated. Thus, it is considered that excellent cycle characteristics can be realized.

As a more preferred embodiment, from the viewpoint of improving a balance between capacity and lifetime characteristics, it is preferable that b, c, and d in the general formula (1) be $0.49 \leq b \leq 0.51$, $0.29 \leq c \leq 0.31$, and $0.19 \leq d \leq 0.21$. For example, as compared with $LiCoO_2$, $LiMn_2O_4$, $LiNi_{1/3}Mn_{1/3}Co_{1/3}O_2$, and the like that exhibit actual performance in a general consumer use battery, $LiNi_{0.5}Mn_{0.3}O_2$ has a large capacity per unit mass. In addition, there as an advantage that a compact battery having a high capacity can be produced since the energy density can be improved, and thus, also from the viewpoint of a cruising distance, $LiNi_{0.5}Mn_{0.3}Co_{0.2}O_2$ is preferable. In terms of having a larger capacity, $LiNi_{0.8}Co_{0.15}Al_{0.05}O_2$ is more advantageous. On the other hand, $LiNi_{0.5}Mn_{0.3}Co_{0.2}O_2$ has lifetime characteristics as excellent as $LiNi_{1/3}Mn_{1/3}Co_{1/3}O_2$.

Meanwhile, preferred examples of the negative electrode active material include a metal such as Si or Sn, a metal oxide such as TiO, $Ti_2O_3$, and $TiO_2$, or $SiO_2$, SiO, and $SnO_2$, a composite oxide of lithium and transition metal such as $Li_{4/3}Ti_{5/3}O_4$ or $Li_7MnN$, a Li—Pb alloy, a Li—Al alloy, Li, and a carbon material such as graphite (natural graphite, artificial graphite), carbon black, activated carbon, carbon fiber, coke, soft carbon, or hard carbon. The negative electrode active material preferably contains an element to be alloyed with lithium. By using the element to be alloyed with lithium, a battery having high energy density, high capacity, and excellent output characteristics can be obtained as compared to the case of using the carbon material. These negative electrode active materials may be used alone or in combination of two or more kinds thereof.

The average particle size of the active material is not particularly limited, but is preferably 1 to 100 μm and more preferably 1 to 20 μm from the viewpoint of higher capacity, reactivity, and cycle durability of the battery. When the average particle size is within such a range, the secondary battery can prevent an increase in internal resistance of the battery at the time of charging and discharging under high output conditions so as to extract a sufficient current. When the active material are secondary particles, the average particle size of primary particles constituting the secondary particles is desirably in a range of 10 nm to 1 μm, but the average particle size is not necessarily limited to this range in this embodiment. However, the active material is not required to be in the state of the secondary particles obtained by aggregation or clusterization, although it depends on the production method. Regarding the particle size of the active material and the particle size of the primary particles, a median diameter obtained by using a laser diffraction method can be used. The shape of the active material varies depending on the type, the production method, or the like, and examples thereof include a spherical shape (a powder shape), a plate-like shape, a needle-like shape, a column-like shape, and a rectangular shape. However, the shape is not limited to these, and any shape can be used without any particular problem. Preferably, an optimum shape capable of improving battery characteristics such as charge and discharge characteristics is selected suitably.

The active material layer of this embodiment further contains other additives such as a conductive aid, a binder, an electrolyte (such as a polymer matrix, an ion conductive polymer, or an electrolyte solution), and a lithium salt for enhancing ion conductivity, as necessary. However, the content of the material, which may function as the active material, in the active material layer is preferably 85 to 99.5% by mass.

(Conductive Aid)

The conductive aid means an additive which is blended in order to enhance the conductivity of the active material layer. Examples of the conductive aid include carbon materials such as carbon black including ketjen black and acetylene black; graphite; and carbon fiber. When the active material layer contains a conductive aid, a conductive network in the inside of the active material layer is formed effectively, and it can contribute to improvement of the output characteristics of a battery. Herein, the content of the conductive aid is not particularly limited as long as the conductivity of the active material layer can be improved up to a desired degree; however, the content thereof is preferably 0.5 to 15% by mass with respect to the total amount of the active material layer (in terms of a solid content), and more preferably 1 to 10% by mass.

(Binder)

The binder has the function of binding the active material, the conductive aid, and the like to each other and maintaining the structure or the conductive network of the active material layer. The material which may be used as the binder is not particularly limited, but when a binder is used in the active material layer including the negative electrode active material, an aqueous binder is preferably included. The aqueous binder has a high binding force, and has advantages of greatly suppressing an investment on facilities of a production line and lowering a burden on environment since water as a raw material is easily available and also water vapor is generated during drying.

The aqueous binder indicates a binder which has water as a solvent or a dispersion medium, and specific examples thereof include a thermoplastic resin, a polymer with rubber elasticity, a water soluble polymer, and a mixture thereof. Herein, the binder which has water as a dispersion medium includes all expressed as latex or emulsion, and it indicates a polymer emulsified in water or suspended in water. Examples thereof include a polymer latex obtained by emulsion polymerization in a self-emulsifying system.

Specific examples of the aqueous binder include a styrene polymer (styrene-butadiene rubber, a styrene-vinyl acetate copolymer, a styrene-acryl copolymer, or the like), acrylonitrile-butadiene rubber, methyl methacrylate-butadiene rubber, a (meth)acrylic polymer (polyethylacrylate, polyethylmethacrylate, polypropylacrylate, polymethylmethacrylate (methyl methacrylate rubber), polypropylmethacrylate, polyisopropylacrylate, polyisopropylmethacrylate, polybutylacrylate, polybutylmethacrylate, polyhexylacrylate, polyhexylmethacrylate, polyethylhexylacrylate, polyethylhexylmethacrylate, polylaurylacrylate, polylaurylmethacrylate, or the like), polytetrafluoroethylene, polyethylene, polypropylene, an ethylene-propylene copolymer, polybutadiene, butyl rubber, fluorine rubber, polyethylene oxide, polyepichlorohydrin, polyphosphagen, polyacrylonitrile, polystyrene, an ethylene-propylene-diene copolymer, polyvinylpyridine, chlorosulfonated polyethylene, a polyester resin, a phenol resin, an epoxy resin; polyvinyl alcohol (the average polymerization degree is preferably 200 to 4000, and more preferably 1000 to 3000, and the saponification degree is preferably not less than 80% by mol, and more preferably not less than 90% by mol) and a modified product thereof (1 to 80% by mol saponified product in a vinyl acetate unit of a copolymer with ethylene/vinyl acetate=2/98 to 30/70 (molar ratio), 1 to 50% by mol partially acetalized product of polyvinyl alcohol, or the like), starch and a modified product thereof (oxidized starch, phosphoric acid esterified starch, cationized starch, or the like), cellulose derivatives (carboxymethyl cellulose, methyl cellulose, hydroxypropyl cellulose, hydroxyethyl cellulose, and salts thereof), polyvinylpyrrolidone, polyacrylic acid (salt), polyethylene glycol, a copolymer of (meth)acrylamide and/or (meth)acrylic acid salt [a (meth)acrylamide polymer, a (meth)acrylamide-(meth)acrylic acid salt copolymer, an alkyl (carbon atom number of 1 to 4) (meth)acrylate-(meth)acrylic acid salt copolymer, or the like], a styrene-maleic acid salt copolymer, a mannich modified product of polyacrylamide, a formalin condensation type resin (a urea-formalin resin, a melamin-formalin resin, or the like), a polyamidepolyamine or dialkylamine-epichlorohydrin copolymer, polyethyleneimine, casein, soybean protein, synthetic protein, and a water soluble polymer such as galactomannan derivatives. These aqueous binders may be used alone or in combination of two or more kinds thereof.

From the viewpoint of a binding property, the aqueous binder preferably contains at least one rubber-based binder selected from the group consisting of styrene-butadiene rubber, acrylonitrile-butadiene rubber, methyl methacrylate-butadiene rubber, and methyl methacrylate rubber. Moreover, from the viewpoint of having a good binding property, the aqueous binder preferably contains styrene-butadiene rubber.

When styrene-butadiene rubber is used as an aqueous binder, the aforementioned water soluble polymer is preferably used in combination from the viewpoint of improving the coating property. Examples of the water soluble polymer which is preferably used in combination with styrene-butadiene rubber include polyvinyl alcohol and a modified product thereof, starch and a modified product thereof, cellulose derivatives (carboxymethyl cellulose, methyl cellulose, hydroxyethyl cellulose, and salts thereof), polyvinylpyrrolidone, polyacrylic acid (salt), and polyethylene glycol. Among them, styrene-butadiene rubber and carboxymethyl cellulose (salt) are preferably combined as a binder. Although the mass content ratio of the styrene-butadiene rubber to the water soluble polymer is not particularly limited, the styrene-butadiene rubber:the water soluble polymer is preferably 1:0.1 to 10, and more preferably 1:0.5 to 2.

The content of the aqueous binder is preferably 80 to 100% by mass, more preferably 90 to 100% by mass, and further preferably 100% by mass with respect to the total amount of the binder.

Further, a binder material other than the aqueous binder is not particularly limited, and examples thereof include a thermoplastic polymer such as polyethylene, polypropylene, polyethylene terephthalate (PET), polyether nitrile (PEN), polyacrylonitrile, polyimide, polyamide, polyamide imide, cellulose, carboxymethyl cellulose (CMC), an ethylene-vinyl acetate copolymer, polyvinyl chloride, styrene-butadiene rubber (SER), isoprene rubber, butadiene rubber, ethylene-propylene rubber, an ethylene-propylene-diene copolymer, a styrene-butadiene-styrene block copolymer and a hydrogen additive thereof, or a styrene-isoprene-styrene block copolymer and a hydrogen additive thereof; a fluorine resin such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), or polyvinyl fluoride (PVF); a vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TFE-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFP-TFE-based fluorine rubber), vinylidene fluoridesperfluoromethyl vinyl ether-tetrafluoroethylene-based fluorine rubber (VDF-PFMVE-TFE-based fluorine rubber), or vinylidene fluoride-chlorotrifluoroethylene-based fluorine rubber (VDF-CTFE-based fluorine rubber); and an epoxy resin. Among these, polyvinylidene fluoride, polyimide, styrene-butadiene rubber, carboxymethyl cellulose, polypropylene, polytetrafluoroethylene, polyacrylonitrile, polyamide, and polyamide imide are more preferable. These preferred binders can be used in the active material layer since these binders are excellent in heat resistance, have a very wide potential window, and are stable with respect to both positive electrode potential and negative electrode potential. These binders may be used alone or in combination of two or more kinds thereof.

The content of the binder is not particularly limited as long as it is sufficient to bind the active material, but is preferably 0.5 to 15% by mass and more preferably 1 to 10% by mass with respect to the total amount (in terms of solid content) of the active material layer. The above-described binder in the present embodiment is not necessarily included as a constituent of the electrode.

The thickness of the active material layer of the present embodiment is not particularly limited, and it is preferably 10 to 100 µm, and more preferably 30 to 50 µm, although conventionally known knowledge on a battery is appropriately referred to.

(Electrolyte Layer)

The electrolyte to be used in the electrolyte layer of this embodiment is not particularly limited, and a liquid electrolyte, a gel polymer electrolyte, or an ionic liquid electrolyte is used from the viewpoint of ensuring the ion conductivity of the active material layer for the above-described nonaqueous electrolyte secondary battery.

The liquid electrolyte has a function as a lithium ion carrier. The liquid electrolyte constituting an electrolyte solution layer has the form in which lithium salt as a supporting salt is dissolved in an organic solvent as a plasticizer. Examples of the organic solvent which can be used include carbonates such as ethylene carbonate (EC), propylene carbonate (PC), dimethyl carbonate (DMC), diethyl carbonate (DEC), and ethylmethyl carbonate. Further, as a lithium salt, a compound which can be added to an active material layer of an electrode, such as $Li(CF_3SO_2)_2N$, $Li(C_2F_5SO_2)_2N$, $LiPF_6$, $LiBF_4$, $LiClO_4$, $LiAsF_6$, $LiTaF_6$, or $LiCF_3SO_3$, can be similarly employed. The liquid electrolyte may further contain an additive in addition to the components described above. Specific examples of such a compound include vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-carbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, allylethylene carbonate, vinyloxymethylethylene carbonate, allyloxymethylethylene carbonate, acryloxymethylethylene carbonate, methacryloxymethylethylene carbonate, ethynylethylene carbonate, propargylethylene carbonate, ethynyloxymethylethylene carbonate, propargyloxyethylene carbonate, methylene ethylene carbonate, and 1,1-dimethyl-2-methylene ethylene carbonate. Among them, vinylene carbonate, methylvinylene carbonate, and vinylethylene carbonate are preferable, and vinylene carbonate and vinylethylene carbonate are more preferable. These cyclic carbonate esters may be used alone or in combination of two or more kinds thereof.

The gel polymer electrolyte has a configuration in which the above-described liquid electrolyte is injected to a matrix polymer (host polymer) formed of an ion conductive polymer. Using the gel polymer electrolyte as an electrolyte is excellent in that the fluidity of an electrolyte disappears and ion conductivity between layers is easily blocked. Examples of an ion conductive polymer which is used as a matrix polymer (host polymer) include polyethylene oxide (PEO), polypropylene oxide (PPO), polyethylene glycol (PEG), polyacrylonitrile (PAN), polyvinylidene fluoride-hexafluoropropylene (PVdF-HEP), poly(methyl methacrylate (PMMA), and copolymers thereof.

A matrix polymer in a gel polymer electrolyte forms a crosslinked structure and thereby can express a superior mechanical strength. To form a crosslinked structure, a polymerization treatment such as thermal polymerization, ultraviolet ray polymerization, radiation polymerization, and electron beam polymerization only needs to be applied to a polymerizable polymer (e.g., PEO, PPO) for polymer electrolyte formation, by using a suitable polymerization initiator.

The ionic liquid electrolyte is obtained by dissolving a lithium salt in an ionic liquid. The ionic liquid is a salt composed of cation and anion alone, and represents a series of compounds which is liquid at normal temperature.

Regarding the cationic component constituting an ionic liquid, it is preferable to use at least one selected from the group consisting of a substituted or unsubstituted imidazolium ion, a substituted or unsubstituted pyridinium ion, a substituted or unsubstituted pyrrolium ion, a substituted or unsubstituted pyrazolium ion, a substituted or unsubstituted pyrrolinium ion, a substituted or unsubstituted pyrrolidinium ion, a substituted or unsubstituted piperidinium ion, a substituted or unsubstituted triazinium ion, and a substituted or unsubstituted ammonium ion.

Specific examples of the anionic component constituting an ionic liquid include halide ion such as fluoride ion, chloride ion, bromide ion, or iodide ion, nitric acid ion ($NO_3^-$), tetrafluoroborate ion ($BF_4^-$), hexafluorophosphate ion ($PF_6^-$), $(FSO_2)_2N^-$, $AlCl_3^-$, lactic acid ion, acetate ion ($CH_3COO^-$), trifluoroacetate ion ($CF_3COO^-$), methanesulfonate ion ($CH_3SO_3^-$), trifluoromethanesulfonate ion ($CF_3SO_3^-$), bis(trifluoromethanesulfonyl)imide ion ($(CF_3SO_2)_2N^-$), bis(pentafluoroethylsulfonyl)imide ion ($(C_2F_5SO_2)_2N^-$), $BF_3C_2F_5^-$, tris(trifluoromethanesulfonyl) carbon acid ion ($(CF_3SO_2)_3C^-$), perchlorate ion ($ClO_4^-$), dicyanamide ion ($(CN)_2N^-$), organic sulfuric acid ion, organic sulfonic acid ion, $R^1COO^-$, $HOOCR^1COO^-$, $OCCR^1COO^-$, and $NH_2CHR^1COO^-$ (in this case, $R^1$ is a substituent and represents an aliphatic hydrocarbon group, an alicyclic hydrocarbon group, an aromatic hydrocarbon group, an ether group, an ester group, or an acyl group, and the substituent may include a fluorine atom).

Preferred examples of the ionic liquid include 1-methyl-3-methylimidazolium bis(trifluoromethanesulfonyl)imide and N-methyl-N-propylpyrrolidinium bis(trifluoromethanesulfonyl)imide. These ionic liquids may be used alone or in combination of two or more kinds thereof.

The lithium salt which is used in the ionic liquid electrolyte is the same as the lithium salt which is used in the liquid electrolyte described above. The concentration of the lithium salt is preferably 0.1 to 2.0 M and more preferably 0.8 to 1.2 M.

An additive as described below may be added to the ionic liquid. When an additive is contained, charge/discharge characteristics and cycle characteristics may be further improved at a high rate. Specific examples of the additive include vinylene carbonate, ethylene carbonate, propylene carbonate, Y-butylolactone, Y-valerolactone, methyl diglyme, sulfolane, trimethylphosphate, triethylphosphate, methoxymethyl ethyl carbonate, and fluorinated ethylene carbonate. These may be used alone or in combination of two or more kinds thereof. The use amount when an additive is used is preferably 0.5 to 10% by mass and more preferably 0.5 to 5% by mass with respect to the ionic liquid.

Further, a separator may be used in an electrolyte layer. The separator has a function of holding an electrolyte so as to secure the lithium ion conductivity between a positive electrode and a negative electrode and a function of serving as a partition wall between the positive electrode and the negative electrode. In particular, in a case where a liquid electrolyte or an ionic liquid electrolyte is used as an electrolyte, it is preferable to use a separator.

Examples of a separator shape include a porous sheet separator or a non-woven separator composed of a polymer or a fiber which absorbs and maintains the electrolyte.

As a porous sheet separator composed of a polymer or a fiber, a microporous (microporous membrane) separator can be used, for example. Specific examples of the porous sheet composed of a polymer or a fiber include a microporous (microporous membrane) separator which is composed of polyolefin such as polyethylene (PE) and polypropylene (PP); a laminate in which plural of them are laminated (for example, a laminate with a three-layer structure of PP/PE/PP), and a hydrocarbon based resin such as polyimide, aramid, or polyvfluorovinylydene-hexafluoropropylene (PVdF-HFP), or glass fiber.

The thickness of the microporous (microporous membrane) separator cannot be uniformly defined as it varies depending on use of application. For example, for an application in a secondary battery for operating a motor of an electric vehicle (EV), a hybrid electric vehicle (HEV), a fuel cell vehicle (FCV), or the like, it is preferably 4 to 60 μm as a monolayer or a multilayer. Fine pore diameter of the microporous (microporous membrane) separator is preferably not more than 1 μm at most (in general, the pore diameter is about several tens of nanometers).

As a non-woven separator, conventionally known ones such as cotton, rayon, acetate, nylon, polyester; polyolefin such as PP and PE; polyimide and aramid are used either singly or as a mixture. Furthermore, the bulk density of a nor-woven fabric is not particularly limited as long as sufficient battery characteristics are obtained with an impregnated polymer gel electrolyte. Furthermore, it is sufficient that the thickness of the non-woven separator is the same as that of an electrolyte layer. Preferably, it is 5 to 200 μm, and particularly preferably, it is 10 to 100 μm.

(Method of Manufacturing Electrode)

Figure 5:
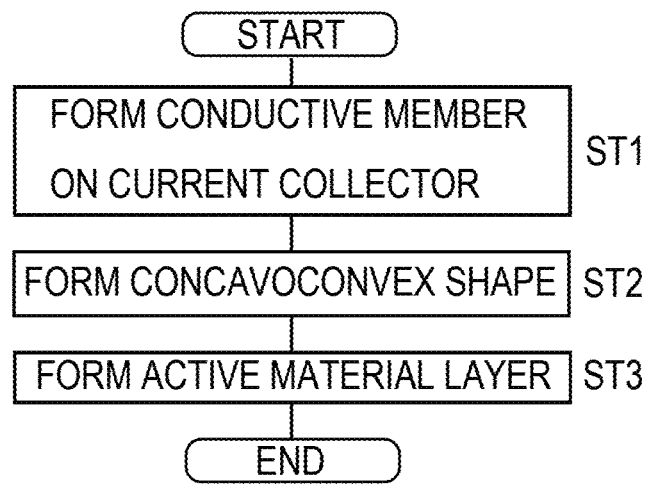
FIG. 5 is a flowchart showing a method of manufacturing an electrode according to one embodiment of the present invention.

FIG. 5 is a flowchart showing a method of manufacturing an electrode according to one embodiment of the present invention. Although the method of manufacturing an electrode not particularly limited, when explanation will be made by exemplifying a positive electrode with reference to FIG. 5, first, after the positive electrode conductive member 14 is formed on the positive electrode current collector 11 (step ST1), the concavoconvex shape 11c is formed on the positive electrode current collector 11 by using the above-described mold 200 (step ST2). Then, the positive electrode active material layer 13 is formed on the positive electrode conductive member 14 (step ST3). Herein, the method for forming a conductive member on a current collector is not particularly limited, but there are mentioned 1) a method of transferring a conductive member, which is separately prepared from a current collector, on a current collector; 2) a method of applying a conductive member, which is separately prepared from a current collector, to a current collector by a conductive adhesive member; 3) a method including a step of applying an ink containing a conductive material onto a current collector including a conductive resin layer to obtain a laminate in which a coating film is formed on the current collector and a step of hot pressing the laminate; and the like. These manufacturing methods will be described.

((1) Method of Transferring Conductive Member onto Current Collector)

In this method, a conductive member, which is separately prepared from a current collector including a conductive resin layer, is transferred onto a current collector.

As a method of separately preparing a conductive member from a current collector, for example, there is mentioned a method of applying an ink containing a conductive material onto a heat-resistant film such as a polyimide film and drying the ink to obtain a conductive member. Further, when the conductive member contains a conductive material and a polymer material, this method is preferably employed. In this case, the conductive member can be obtained by a method of melting and mixing the conductive material and the polymer material and then rolling the melted-and-kneaded material by a hot pressing device.

As a solvent used in the ink, for example, ketones such as acetone, aromatic hydrocarbon solvents such as toluene and xylene, solvents such as N-methyl-2-pyrrolidone (NMP), dimethylformamide (DMF), dimethylacetamide (DMAc), dimethylsulfoxide (DMSO), tetrahydrofuran acetonitrile and the like can be used. These may be used alone or may be used as a mixture of two or more kinds thereof.

The concentration of the conductive material in the ink is not particularly limited. The coating method is also not particularly limited, but examples thereof include coating with a brush, a bar coating method, a spray coating method, a screen printing method, and an inkjet method. Although the appropriate applied amount of the conductive material varies depending on the type of the conductive material and cannot be specified unconditionally, it is preferable to adjust the applied amount to an amount that achieves a small contact resistance with the active material layer and that although slightly overlapping the active material layer, achieves not too much thick thickness of the conductive material with respect to the thickness of the active material layer. The drying temperature and the drying time are not particularly limited, and may be appropriately determined depending on a solvent to be used in a range that deterioration of the material does not occur.

As a method of transferring the conductive member obtained after drying or the conductive member obtained by melting and mixing, and rolling onto the current collector, there are mentioned methods such as hot pressing using a known heat roll apparatus, hot pressing apparatus, or the like.

When the conductive member is prepared on the heat-resistant film, the conductive member can be formed on the current collector by peeling the heat-resistant film after transfer.

((2) Method of Applying Conductive Member to Current Collector Conductive Adhesive Member)

In this method, a conductive member, which is separately prepared from a current collector including a conductive resin layer, is applied onto a current collector by using a conductive adhesive member. A method of separately producing a conductive member from a current collector is the same as the contents described in the above-described section, and thus the description thereof is omitted herein.

The conductive adhesive member contains a monomer or oligomer having two or more thermally polymerizable groups in one molecule, a conductive material, a polymerization initiator, or the like.

Examples of the monomer or oligomer include bifunctional (meth)acrylate such as ethylene glycol di(meth)acrylate, diethylene glycol di(meth)acrylate, triethylene glycol di(meth)acrylate, tetraethylene glycol di(meth)acrylate, propylene glycol di(meth)acrylate, dipropylene glycol di(meth)acrylate, tripropylene glycol di(meth)acrylate, 1,3-butanediol di(meth)acrylate, 1,4-butanediol di(meth)acrylate, or 1,6-hexanediol di(meth)acrylate; trifunctional (meth)acrylate such as trimethylolpropane tri(meth)acrylate or pentaerythritol tri(meth)acrylate; and tetrafunctional (meth)acrylate such as ditrimethylolpropane tetra(meth)acrylate or pentaerythritol tetra(meth)acrylate. In addition to the above-described examples, monomers such as urethane (meth)acrylate, a copolymerization oligomer thereof, and a copolymerization oligomer with acrylonitrile are exemplified, but the monomer or oligomer is not limited thereto. The term "(meth)acrylate" described in the present specification indicates methacrylate and/or acrylate.

Further, examples of the conductive material include carbon materials such as acetylene black, ketjen black, carbon black, graphite, vapor-phase grown carbon fibers, and carbon nanotube; and powder of metals such as gold, silver, copper, aluminum, nickel, and magnesium. Examples of the polymerization initiator include dicumyl peroxide, di-t-butyl peroxide, t-butyl peroxybenzoate, t-butyl hydroperoxide, benzoyl peroxide, and cumene hydroperoxide.

The monomer or oligomer, the conductive material, and the polymerization initiator respectively may be used alone or may be used as a mixture of two or more kinds thereof.

In the case of such a production method, the in-plane variation of the contact resistance is reduced.

((3) Method of Applying Ink onto Current Collector to Obtain Laminate and Then Hot Pressing Laminate)

In this method, an ink containing a conductive material is applied onto a current collector to form a coating film on the current collector and thus to obtain a laminate, and then the laminate is hot pressed. Although a conductive member can be formed on a current collector without performing hot pressing, from the viewpoint of more efficiently performing electrical contact between a conductive filler and the conductive member and further reducing the contact resistance, it is preferable to perform hot pressing.

The solvent used in the ink, the concentration of the conductive material in the ink, the coating method, the drying conditions, and the like are the same as the contents described in the section of the above (1), and thus the description thereof is omitted herein.

After the laminate is obtained, hot pressing can be performed by using a known heat roll apparatus, hot pressing apparatus, or the like. As an example of hot pressing conditions, when the polymer material contained in the conductive resin layer is polypropylene, hot pressing is preferably performed at a temperature range of 170 to 200° C. under the pressing condition that the conductive resin layer does not become thin. In particular, hot pressing is preferably performed at a temperature slightly higher than a melting point of the polymer material contained in the conductive resin layer. With such a temperature range, at least a part of the polymer material is melted, and the conductive filler in the conductive resin layer and the conductive member are easily in electrical contact with each other, which is preferable. Further, hot pressing is preferable since a structure as described above in which at least a part of the conductive member is embedded in the surface of the conductive resin layer can be more easily obtained.

Among the methods (1) to (3), the method (3) is preferable. That is, in the method of manufacturing an electrode according to the present embodiment, an ink containing a conductive material is applied to the positive electrode current collector 11 having a conductive resin layer containing a polymer material and a conductive filler, and a coating film is formed on the current collector. Then, using the mold 200, the mold 200 having a concavoconvex shape is pressed against the coating film of the positive electrode current collector 11, and hot pressing is performed to form the concavoconvex shape 11c in the positive electrode current collector 11. Then, the positive electrode active material layer 13 is formed at a site of the positive electrode current collector 11 where the concavoconvex shape 11c is provided. By adopting such a method, the electrical contact between the conductive filler in the conductive resin layer and the positive electrode conductive member 14 is efficiently and stably formed, and it is possible to further reduce the contact resistance and to further improve durability.

When the conductive member has a laminate structure of two or more layers, at least two layers of the conductive member are preferably applied to each other by a conductive adhesive member. When application is performed by using the conductive adhesive member, the in-plane variation of the contact resistance can be reduced. The same conductive adhesive member as described in the section of the above can be used as the conductive adhesive member used at this time, and there is no particular limitation.

In the formation of the concavoconvex shape 11c, the current collector 11 before formation shown in FIGS. 4A and 4B is placed on a fixed mold, the mold 200 as a movable mold is brought close to the fixed mold, and the concavoconvex shape of the mold 200 is transferred to the current collector 11 by using the fixed mold and the movable mold, whereby the concavoconvex shape 11c can be formed. The mold on which the current collector 11 is placed may be a movable mold, and the mold 200 may be a fixed mold.

As described above, the conductive member is formed on the current collector, the concavoconvex shape 11c is formed, and then the active material layer is formed on the conductive member. Consequently, the electrode of the present invention can be manufactured. Herein, the method of forming an active material layer on the conductive member is not particularly limited, and the same method as a known method can be employed, or a method with appropriate modification can be employed. Hereinafter, a preferred embodiment of the method of forming an active material layer on the conductive member will be described, but the present invention is not limited to the following embodiment. For example, a slurry is prepared by dispersing an active material and, as necessary, another component such as a binder in a predetermined dispersion solvent, and this slurry is applied onto a separator, a conductive member, or a current collector and dried. Herein, a solvent which can be used as the dispersion solvent is not particularly limited, but for example, ketones such as acetone, aromatic hydrocarbon solvents such as toluene and xylene, solvents such as N-methyl-2-pyrrolidone (NMP), dimethylformamide (DMF), dimethylacetamide (DMAc), dimethylsulfoxide (DMSO), tetrahydrofuran (THF), acetonitrile, and the like can be used. These may be used alone or may be used as a mixture of two or more kinds thereof. The concentration of the active material in the slurry is not particularly limited, but can be appropriately selected depending on the thickness of the active material layer, or the like. The coating method is also not particularly limited, but examples thereof include coating with a brush, a bar coating method, a spray coating method, a screen printing method, and an inkjet method or the like. The applied amount of the active material is not particularly limited. The drying temperature and the drying time are not particularly limited. The drying may be performed under atmospheric pressure or under reduced pressure.

The electrode of the present invention manufactured as described above is suitably used in a lithium ion secondary battery. The lithium ion secondary battery is not limited to a flat shape of laminate type, and may be a winding type lithium ion secondary battery. The winding type lithium ion secondary battery may have a barrel shape or a flat and rectangular shape obtained by modifying the barrel shape, and thus there is no particular limitation. As an outer casing material of the barrel shape, a laminate film may be used, or a barrel can (metal can) in the prior art may be used, and thus there is no particular limitation. Preferably, the power generating element is encased with an aluminum laminate film. The weight reduction may be achieved with such configuration.

In the lithium ion secondary battery, known knowledge of the related art is appropriately employed for a main component member (an active material layer, an electrolyte layer, a current collecting plate, a lead, an outer casing material, or the like) other than the electrode. Further, the lithium ion secondary battery can be produced by a known production method of the related art.

The lithium ion secondary battery having the electrode can be suitably used as a power source or an auxiliary power source for operating a vehicle, such as an electric vehicle, a hybrid electric vehicle, a fuel cell vehicle, or a hybrid fuel cell vehicle, requiring a high mass energy density, a high mass output density, or the like.

Further, the electrode is not limited to the use for the lithium ion secondary battery, but can also be applied to a secondary battery of another type, and further applied to a primary battery.

(Operational Advantage)

Next, the operational advantage of the present embodiment will be described. In a conventional electrode using a resin in a current collector, there is a problem that the contact resistance at an interface between the resin current collector and an active material layer tends to become large. On the other hand, in the electrode according to the present embodiment, the concavoconvex shape 11c coinciding with the concavoconvex shape 13c formed on the positive electrode active material layer 13 is formed on the contact surface between the positive electrode current collector 11 containing resin and the positive electrode active material layer 13. Thus, a sufficient contact area between the positive electrode active material layer 13 and the positive electrode current collector 11 can be ensured, and an increase in the contact resistance of the contact surface can be suppressed. In the concavoconvex shape 11c of the positive electrode current collector 11, the positive electrode conductive member 14 is provided in a state of existing in the positive electrode current collector 11 beyond the surface of the positive electrode current collector 11. Thus, the conductive filler and the positive electrode conductive member 14 can easily come into contact with each other, the contact resistance can be reduced, and the electron conductivity can be improved.

The positive electrode conductive member 14 disposed in the positive electrode current collector 11 adopts particulate or fibrous form specifically, so that it is possible to increase an electronic contact portion between the positive electrode current collector 11 and the positive electrode active material layer 13 and to reduce the contact resistance.

As the method of manufacturing an electrode according to the present embodiment, as described above, an ink containing a conductive material is applied to the positive electrode current collector 11 to form a coating film. Then, the mold 200 having a concavoconvex shape corresponding to an interface of the positive electrode active material layer 13 is pressed against the coating film of the positive electrode current collector 11, and hot pressing is performed. Then, the concavoconvex shape 11c is formed on the contact surface with the positive electrode active material layer 13 in the positive electrode current collector 11, and the positive electrode active material layer 13 is formed on the positive electrode current collector 11, whereby the electrode can be manufactured.

The present embodiment is not limited to the above-described embodiment, and various modifications are possible within the scope of the claims. In the above description, although the thickness of the active material layer has not been specifically mentioned, the thickness of the positive electrode and/or the negative electrode may be thicker than the prior art in order to improve the energy density of the battery. In this specification, the case where the thickness of the positive electrode and the negative electrode is specifically large means the case where the thickness of the active material layer is not less than 150 μm.

Figure 6:
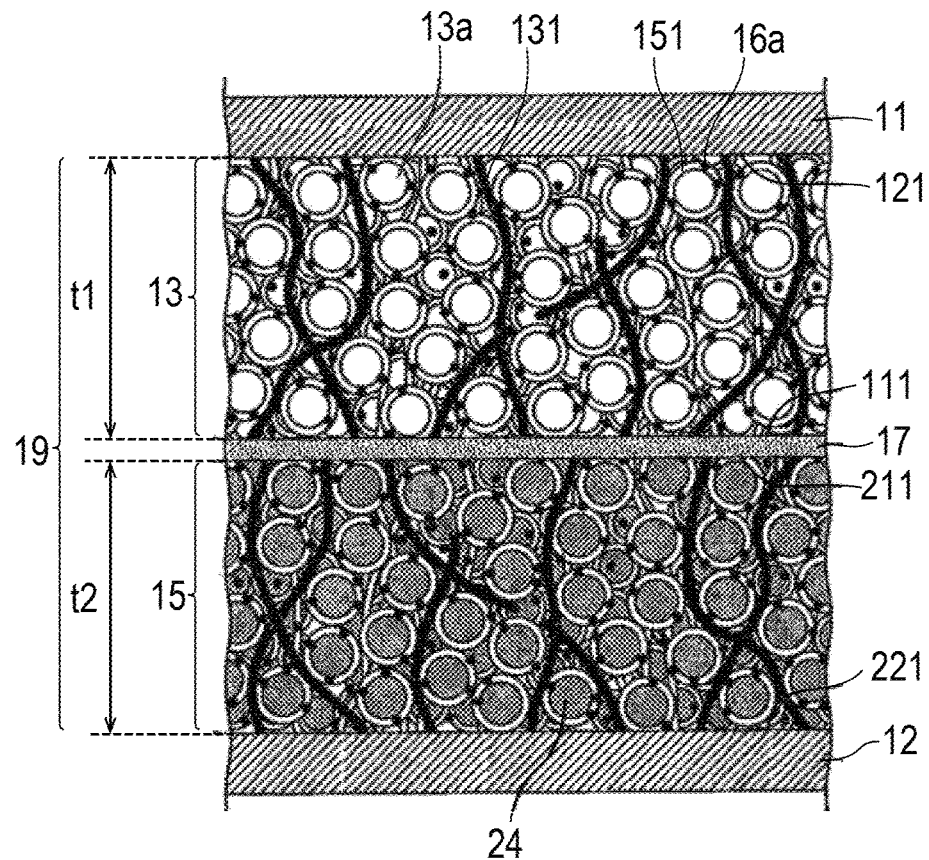
FIG. 6 is a cross-sectional view showing a thick film electrode according to a modified example of the embodiment of the present invention.

FIG. 6 is a cross-sectional view showing an electrode according to a modified example of the embodiment of the present invention. An electrode having a relatively thick active material layer as in this modified example is also called a thick-film electrode. The positive electrode active material layer 13 shown in FIG. 6 includes a positive electrode active material 13a, a covering resin 151 covering the positive electrode active material 13a, a conductive aid 16a disposed around the positive electrode active material 13a, a first surface 111 disposed on the side of an electrolyte layer 17, a second surface 121 disposed on the side of the current collector 11 opposite to the first surface 111, and a conductive fiber 131 as a conductive member that electrically connects the first surface 111 and the second surface 121.

Since the positive electrode active material 13a is the same as the positive electrode active material described above, description thereof will be omitted. The covering resin 151 is a resin covering the positive electrode active material 13a, and as an example, a urethane resin obtained by reacting an active hydrogen component with an isocyanate component can be exemplified. The active hydrogen component preferably contains at least one selected from the group consisting of polyether diol, polycarbonate diol, and polyester diol.

The conductive aid 16a is selected from materials having conductivity. Specific examples thereof include metals {such as aluminum, stainless steel (SUS), silver, gold, copper and titanium}, carbon {such as graphite and carbon black [such as acetylene black, ketjen black, furnace black, channel black, and thermal lamp black]}, and mixtures thereof, but are not limited thereto. These conductive aids may be used alone or in combination of two or more kinds thereof. Alloys or metal oxides thereof may also be used. From the viewpoint of electrical stability, the conductive aid is preferably aluminum, stainless steel, carbon, silver, gold, copper, titanium and mixtures thereof, more preferably silver, gold, aluminum, stainless steel and carbon, and particularly preferably carbon. These conductive aids may be in the form of a particulate ceramic material or resin material coated therearound with a conductive material (metal conductive material among the above-described conductive materials) by plating or the like.

One end of a part of the fibers of the conductive fiber 131 reaches the surface on the current collector 11 side, and the other end reaches the surface on the electrolyte layer 17 side. At least a part of the conductive fibers 131 is configured as a conductive path forming a network of electrons from the first surface 111 to the second surface 121. The conductive fibers 131 are continuously arranged from the first surface 111 to the second surface 121.

Herein, the expression "continuously arranged" means not only the case where one conductive fiber is disposed from the first surface 111 to the second surface 121 but also the case where a plurality of conductive fibers is continuously connected and arranged from the first surface 111 to the second surface 121. In some cases, the active material has relatively low electron conductivity, and as in the present modified example, the conductive fibers 131 having higher electron conductivity than the active material are arranged from the first surface 111 of the active material layer to the second surface 121, whereby it is possible to improve the electron conductivity even for a thick-film electrode.

Examples of the conductive fiber 131 include carbon fibers such as PAN-based carbon fibers and pitch-based carbon fibers, conductive fibers containing a highly conductive metal or graphite uniformly dispersed in synthetic fibers, metal fibers obtained by converting metals such as stainless steel into fibers, conductive fibers containing organic fibers whose surface is coated with a metal, and conductive fibers containing organic fibers whose surface is coated with a resin containing a conductive substance. Among these conductive fibers, carbon fibers are preferred.

The negative electrode active material layer 15 includes a negative electrode active material 24, a first surface 211 disposed on the electrolyte layer 17 side, a second surface 221 disposed on the negative electrode current collector 12 side, conductive fibers 131 continuously arranged from the first surface 211 to the second surface 221, the covering resin 151, and the conductive aid 16a. In the configuration of the negative electrode active material layer 15, the negative electrode active material 24 is similar to the negative electrode active material described above, and the conductive fiber 131, the covering resin 151, and the conductive aid 16a are similar to the positive electrode active material layer 13; therefore, description thereof will be omitted.

A thickness t1 of the positive electrode active material layer 13 and a thickness t2 of the negative electrode active material layer 15 are preferably 150 to 1500 μm, more preferably 200 to 950 μm, and further preferably 250 to 900 μm. Thus, even in a thick-film electrode, by continuously arranging the conductive fibers 131 from the first surfaces 111 and 211 to the second surfaces 121 and 221, the network of electrons is formed in the thickness direction, so that the electron conductivity can be improved without losing percolation.

EXAMPLES

Next, the contact resistance of the electrode according to the present embodiment was confirmed, and thus description will be made. First, 1.16 parts by weight of hard carbon having a particle size of 6 μm, 2.40 parts by weight of KF polymer #1120 manufactured by Kureha Corporation, and 26.40 parts by weight of N-methylpyrrolidone were mixed at 2000 rpm for 5 minutes by a rotating and revolving mixer (Awatori Rentaro). Then, a slurry for forming a surface filler layer was thereby obtained.

Then, a gap was set to 150 μm, and the slurry formed as above was applied onto a resin current collector film by an applicator at a speed of 2 cm/sec. Then, the slurry-coated resin current collector was dried at 80° C. for 12 hours under atmospheric pressure.

Regarding the formation of concavoconvexes, a heat roller (Imoto Machinery Co., Ltd.) was set at 160° C. which is not less than the melting point of a resin. Then, the resin current collector was applied to a mold such that a concavoconvex surface of the mold was in contact with a surface on which the surface filler layer was formed, and the resin current collector and the mold were sandwiched using thin SUS plates. Then, the resin current collector and the mold sandwiched between the SUS plates were passed through the heat roller. The speed is about 1 cm/sec.

Figure 7A:
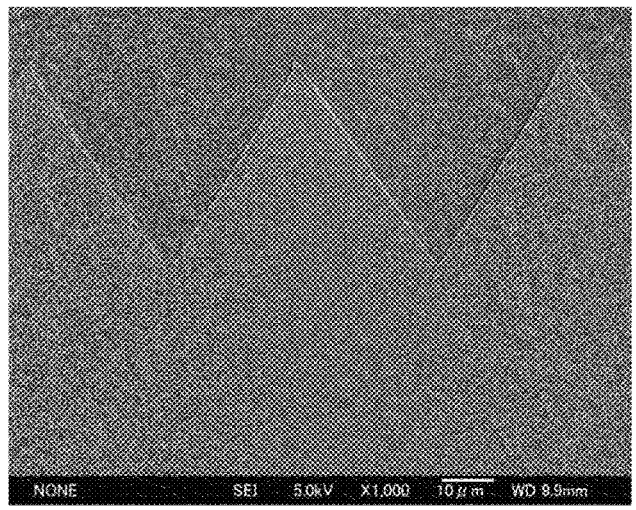
FIG. 7A is a cross-sectional image showing an interface between a current collector and an active material layer according to a comparative example.
Figure 7B:
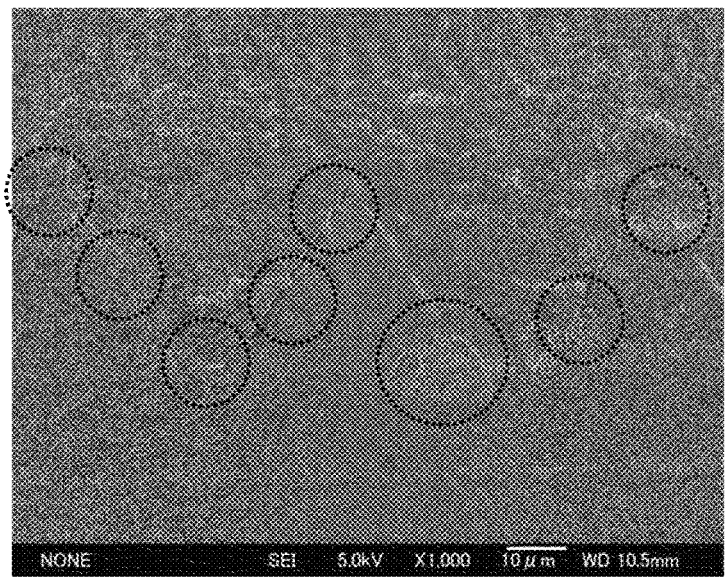
FIG. 7B is a cross-sectional image showing an interface between a current collector and an active material layer according to an example of the present invention.

FIG. 7A is a cross-sectional image showing an interface between a current collector and an active material layer according to a comparative example, and FIG. 7B is a cross-sectional image showing the interface between the current collector and the active material layer according to an example of the present invention. The above experiment was conducted on the following objects. As the example, as shown in FIG. 7B, a resin current collector in which a filler layer is formed at the interface between the current collector and the active material layer (refer to the broken line circle in FIG. 7B), and concavoconvexes are formed using a mold is the experiment object.

In Comparative Example 1, the filler layer is not formed at the interface between the current collector and the active material layer, and no concavoconvexes are also formed using a mold. In Comparative Example 2, although a filler layer is formed at the interface between the current collector and the active material layer, no concavoconvexes are formed using a mold. In Comparative Example 3, as shown in FIG. 7A, although a filler layer is not formed at the interface between the current collector and the active material layer, concavoconvexes are formed using a mold.

In this experiment, as a dummy electrode, 2 parts by weight of carbon nanofibers produced with reference to a document (Eiichi Yasuda, Asao Oya, Shinya Komura, Shigeki Tomonoh, Takashi Nishizawa, Shinsuke Nagata, Takashi Akatsu, CARBON, 50, 2012, 1432-1434 and Eiichi Yasuda, Takashi Akatsu, Yasuhiro Tanabe, Kazumasa Nakamura, Yasuto Hoshikawa, Naova Miyajima, TANSO, 255, 2012, pp. 254 to 265) and 43 weight of an electrolyte solution (manufactured by Tomiyama Pure Chemical Industries, Ltd., 1M $LiPF_6$ EC:DEC (3:7) solution) are kneaded for 7 minutes at 2000 rpm by a rotating and revolving mixer.

Further, 98 parts by weight of coated NCA (NCA/acrylic resin/AB=96.4/0.5/3) was added, and the mixture was kneaded for 4 minutes at 2000 rpm by a rotating and revolving mixer. An electrode was produced such that the slurry was in contact with a treatment surface of the resin current collector by using a mask punched with an electrode pattern and a squeegee, and an excess electrolyte solution was sucked off with a Kimwipe.

A measurement of resistance was performed as follows. First, three layers of resin current collector/dummy electrode/resin current collector were formed such that the treatment surface of the surface-treated resin current collector was in contact with the dummy electrode. An electric resistance measuring machine A (Imoto Machinery Co., Ltd.) was used for measurement of penetration resistance, and a sample was sandwiched by a measuring section with a diameter of 20 mm. Then, 2.5 kg weight load (corresponding to about 0.8 kg atmospheric pressure) was applied, and a resistance value was read. Then, bulk resistance of the resin current collector, bulk resistance of the dummy electrode, and contact resistance of the measuring section and the resin current collector were subtracted from the penetration resistance, thus obtaining contact resistance between the dummy electrode and the resin current collector.

Figure 8:
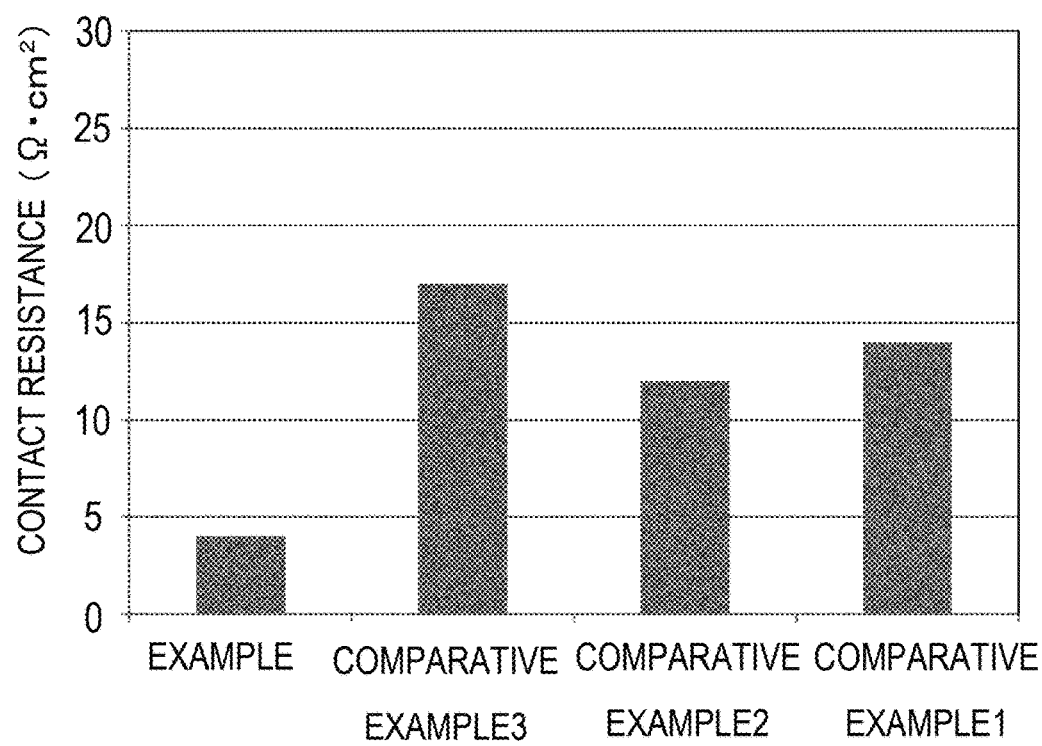
FIG. 8 is a graph showing contact resistance between a current collector and an active material layer in each of an example and comparative examples.

The bulk resistance referred hereto means average resistance of the entire film in the thickness direction of the film. The penetration resistance is resistance in the film thickness direction, is a resistance value obtained when a constant pressure is applied during sandwiching between gold-plated discs, and includes contact resistance at an interface in addition to the bulk resistance described above. FIG. 8 is a graph comparing the contact resistances in the example of the present invention and the comparative examples.

According to FIG. 8, the contact resistance of the electrode according to the example is reduced to about 30% at the maximum as compared with Comparative Examples 1 to 3, and it could be confirmed that the contact resistance between the current collector and the active material layer could be sufficiently reduced.

This application is based on Japanese Patent Application No. 2015-209303 filed on Oct. 23, 2015, and its disclosure is incorporated herein by reference in its entirety.

REFERENCE SIGNS LIST

11 Positive electrode current collector
11*c* Concavoconvex shape (second concavoconvex shape)
13 Positive electrode active material layer
13*c* Concavoconvex shape (first concavoconvex shape)
14 Positive electrode conductive member (conductive member of current collector)
15 Negative electrode active material layer
16 Negative electrode conductive member (conductive member of current collector)
17 Electrolyte layer
19 Single battery layer
131 Conductive fiber (conductive member of active material layer)

The invention claimed is:

1. An electrode comprising:
    a resin current collector containing a polymer material and a conductive filler;
    an active material layer disposed adjacent to the resin current collector; and
    a second concavoconvex shape that coincides with a first concavoconvex shape formed on a surface of the active material layer that is in contact with the resin current collector, the second concavoconvex shape being formed on a surface of the resin current collector that is in contact with the active material layer,
    wherein the active material layer is disposed between the resin current collector and an electrolyte layer,
    the active material layer comprises a plurality of active materials and a first conductive member continuously arranged from a surface on the resin current collector side to a surface on the electrolyte layer side and having higher electron conductivity than the active material, and
    in the second concavoconvex shape in the resin current collector, at least a part of a second conductive member that is in electrical contact with the conductive filler exists in the resin current collector beyond the surface of the resin current collector.

2. The electrode according to claim 1, wherein the second conductive member includes a particulate or fibrous structure.

3. A method of manufacturing the electrode according to claim 1, comprising:
    applying ink containing a conductive material to the resin current collector to form a coating film on the resin current collector;
    pressing a mold comprising a surface shape of the second concavoconvex shape against the coating film of the resin current collector to perform hot pressing and thus to form the surface shape of the mold on the resin current collector; and
    forming the active material layer at a site of the resin current collector where the second concavoconvex shape is provided.

4. The electrode according to claim 1, wherein the first conductive member is a conductive fiber.

* * * * *